United States Patent [19]

Rowsell et al.

[11] Patent Number: 5,318,136
[45] Date of Patent: Jun. 7, 1994

[54] DRILLING PROCESS AND APPARATUS

[75] Inventors: Philip J. Rowsell, Beeston; Martin D. Waller, Ravenshead, both of United Kingdom

[73] Assignee: University of Nottingham, Nottingham, United Kingdom

[21] Appl. No.: 924,057

[22] PCT Filed: Mar. 6, 1991

[86] PCT No.: PCT/GB91/00348
§ 371 Date: Sep. 4, 1992
§ 102(e) Date: Sep. 4, 1992

[87] PCT Pub. No.: WO91/14214
PCT Pub. Date: Sep. 19, 1991

[30] Foreign Application Priority Data

Mar. 6, 1990 [GB] United Kingdom ............... 9004952

[51] Int. Cl.$^5$ .................................................. E21B 44/00
[52] U.S. Cl. ............................................................ 175/24
[58] Field of Search ........................... 175/24–27, 175/39, 40; 364/474.01, 474.02

[56] References Cited

U.S. PATENT DOCUMENTS 4,346,444 8/1982 Schneider et al. ............ 364/474.01
4,407,017 9/1983 Zhilikov et al. .................. 175/24 X
4,854,786 8/1989 Alexander et al. ......... 364/474.02 X

FOREIGN PATENT DOCUMENTS 0339659 11/1989 European Pat. Off. .

OTHER PUBLICATIONS

"The Concept of Specific Energy In Rock Drilling," R. Teale, Int. J. Rock Mech. Mining Sci., vol. 2, pp. 57–73, Pergamon Press 1965.

"Performance and Wear Characteristics in Diamond Core Drilling", Cassapi et al., Drillex '87 Conference, Warwickshire England, Apr. 7–10, 1987.

"Drilling Practices Manual," Second Edition, Preston L. Moor, Pennwell Publishing Company, 1974, pp. 17–21.

Primary Examiner—Thuy M. Bui
Attorney, Agent, or Firm—Finnegan, Henderson, Farabow, Garrett & Dunner

[57] ABSTRACT

In a drilling process speed, bit thrust and penetration are monitored. Data stored in a data base relating rotational speed and thrust as adjustable variables is correlated with data on the penetration rate as controlled parameter to produce a matrix to enable prediction of penetration rate to be expected at known thrust and rotational rates. Likewise a similar matrix may be constructed for relating wear rate to adjustable variables for example speed and thrust. The parameters predicted from these variables at various values for the speed and thrust are used to construct a further matrix relating bit penetration and bit wear rates with cost per unit distance drilled and this third matrix searched for minimum cost. From the first two matrices rotation rate of the drill bit and thrust applied to the drill bit are adjusted to give a predicted penetration rate for minimum cost and the drill bit is operated at these conditions. All conditions are monitored and the information used to recalculate the various matrices to define the process.

14 Claims, 5 Drawing Sheets

DRILLING PROCESS AND APPARATUS

This invention is concerned with improvements in or relating to drilling processes and drilling apparatus and is especially concerned with optimisation of rotary drilling parameters, for example in drilling through rock strata when drilling for minerals, gas or oil.

Drilling activities in the mining and oil industries are highly susceptible to the economic fortunes of those industries.

During periods of strong product prices the drilling market is buoyant, however depressed prices result in fierce competition and cost cutting amongst both contractors and supply companies. The continuing pressure on prices is causing increased interest in the efficiency of drilling operations and the optimisation of drilling performances. Improvements have been progressively made in increasing in drilling efficiency and advances in computer technology have enabled development of automated drilling rigs which include both functional control and data logging facilities.

However, obtaining optimum performance in drilling operations still remains highly dependent on the skill, expertise and experience of the personnel involved.

Optimum performance can be judged by considering any one or a combination of factors including drilling rate, total time to hole completion, percentage core recovery, bit lift, etc. In the current highly cost conscious climate the ultimate criteria is the total cost of hole production. This figure will be dependent on a broad range of factors, some external to the rig operation and others highly dependent on the drilling parameters selected by the rig operator. The drilling parameters are all highly interdependent and are also influenced by external factors, often unknown and beyond the control of the operator. The application of a control scheme in such an environment is fraught with difficulty.

As an alternative and simpler control parameter, the current cost per unit distance drilled is convenient. Minimising the cost per unit distance may not necessarily give a true minimum cost to completion, in view of unpredictable future elements which may be met in the drilling process but this does provide a basis for a useful control system.

The variable costs involved are highly dependent on the performance of the drilling operation which is controlled by the nature and condition of the strata, the bit and the drilling parameters selected by the rig operator. Most of these costs exhibit a time dependence and include:
Manpower
Consumables
  fuel
  muds, etc
  bits, reamers, tubulars
Rig charge
Maintenance
Casing programme

Manpower

The manpower requirements depend to a large extent on the size and complexity of the drilling operation. This in turn is determined by the depth and application of the hole. The size of rig crews vary from single operator small rigs up to crews of seven or more for large land based rigs.

A typical crew for a large rig might be made up from;
Tool pusher
Driller
Assistance driller
Derek man
Floor man (2)
Mudboy
Mechanic In addition there will probably be a drilling superintendent who may have control over several site operations. The actual cost of manpower varies considerably with location, typically in Europe they may make up around 12% of the total cost (4). The contribution of manpower to the total cost can be considered on a per unit time basis, and as such is directly related to the rate of progress of the hole. It should be noted that the rate of progress must include consideration of both the rate of penetration and the tripping times.

Consumables

Fuel costs are a function of both the total time to completion and the power requirements for rotation and circulation. the fuel cost may be minimised by maintaining good cutting efficiency which will generally yield high penetration rates. For any given rock type, drilling parameters can be chosen which yield a minimum power requirement per unit distance drilled. These performance figures are directly related to the Specific Energy of the rock.

Mud costs are mainly dependent on the strata type, depth and hole condition. These are mostly beyond the control of the driller, however the correct selection of mud properties and circulation rates is critical to the success of the operation.

The unit cost of tools is primarily dependent on the size of hole and the method of drilling used. Tool costs have fluctuated during the past decade reflecting the varying fortunes of the industry. New materials, in particular Polycrystalline Diamond Compacts [PDC's] offer great potential for both improved performance and reduced overall cost. These materials are finding increasing favour in both small and large hole drilling and offer the following advantages;
Increased penetration rate
Reduced wear rate
Increased range of drillable strata.

However to maximise the benefit from the use of PDC bits the operating characteristics of rigs will require adaptation.

During the production of the hole, the cost for bits is dependent on their wear rates. The wear rate is controlled both by selection of appropriate bit type and the control of operating parameters to match the strata type and condition.

Rig Charges

Rig charges have fluctuated considerably during the past decade following the prices of raw materials and oil. Scales of charges range from hundreds of pounds to tens of thousands of pounds per day and constitute a major component of the total drilling cost. Because of the long term planning requirements of the large rig owners charges are increased if projects over run the planned duration. Even if the project is completed before the planned date additional costs may be levied to cover the cost of storage prior to the next contract. Rig costs are therefore important to the proposed control system.

Costs can vary from as little as £1 per meter for production hole drilling using PDC bits in a hydraulic boomer to more than £2000 per meter for deep oil and gas wells.

Figure 1:
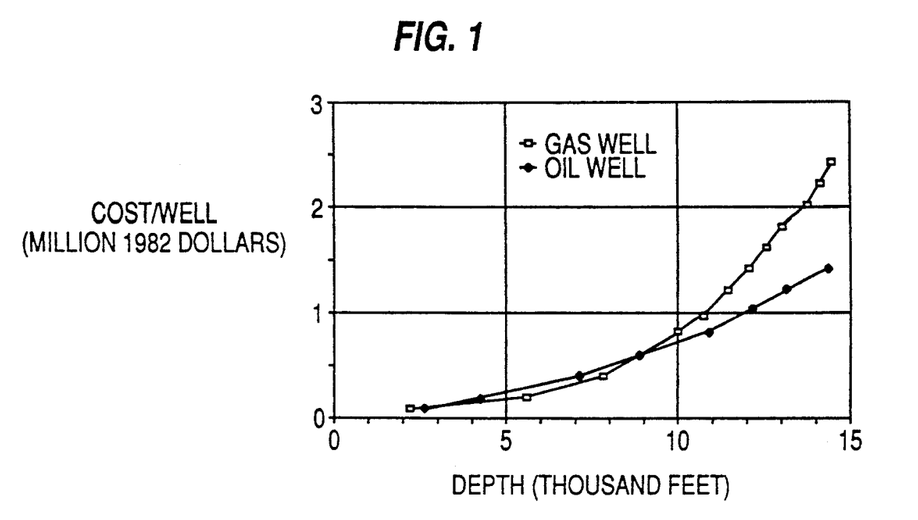
FIG. 1 is a graph indicating the relationship between cost of drilling and equipping oil and gas wells at various depths in West Texas.

The relationship between depth and cost is illustrated in FIG. 1, which relates to operating cost only. As an indication of the breakdown of the total cost, Table 1, shows the percentage of the total cost allocated to each of the drilling activities. This highlights the importance of rig charges and consumables which together constitute more than half of the total cost.

TABLE 1

| Costs | % |
|---|---|
| Rig | 24 |
| Manpower | 12 |
| Services | 12 |
| Consumables | 34 |
| Others | 18 |

Table 1 : Distribution of total drilling costs (Western Europe, deep oil and gas) (4).

In order to provide a suitable control, the parameter or parameters for control must first be identified and desired values of these parameters established. Secondly the controlling action to be applied to the process to achieve the desired values of the parameters changing certain adjustable process variables must be identified and, finally, a method for monitoring the controlled parameters must be established.

In a drilling system, penetration rate is a desirable controlled parameter which can be varied by changing a number of independent adjustable variables, for example the thrust of the drill bit or the rate of rotation of the drill bit: effect of these adjustable variables on the penetration rate, a first controlled parameter, can be measured from the rate of movement of rods, cross head, draw works, etc.

In one aspect the invention may be considered to provide a drilling process comprising urging a rotating drill bit towards a mass to be drilled, and controlling the thrust applied and the speed of rotation, the process comprising monitoring at least one parameter selected from control parameters including rate of penetration of the drill bit and wear rate of the drill bit, and adjusting at least one related variable selected from adjustable variables including rate of rotation of the drill bit and thrust applied to the drill bit to an operating value at which the selected parameter is substantially optimum.

In another aspect the invention may be considered to provide a drilling process comprising establishing a first matrix storing known data relating variables selected from adjustable variables incuding rotation rate of a drill bit and thrust applied to a drill bit, to a first parameter selected from control parameters including bit penetration rate and bit wear rate, and using the known data points to interpolate predicted values for the first controlled parameter for other values of the adjustable variables, establishing a second matrix storing known data relating the first parameter and a second controlled parameter, to a third parameter, and using the known data points to interpolate predicted values for the third parameter for other values of the first and second controlled parameters, searching the second matrix for an optimum value of the third parameter and thereby determining optimum values for the first and second parameters and adjusting the adjustable variables to the value indicated by the first matrix to be necessary to achieve the determined optimum value for the first controlled parameter.

In yet a further aspect the invention may be considered to provide drilling apparatus comprising means for rotatably mounting a drill bit, a motor for rotating a drill bit mounted in the mounting means, means for controlling the speed of rotation of the bit, means for controlling the thrust applied to the drill bit in a drilling operation, means for determining the rate of penetration of a drill bit in a drilling operation, and computer means comprising a memory store in which data relating to at least one selected from adjustable variables including rotation of the drill bit and thrust applied to the drill bit and at least one parameter selected from controlled parameters including rate of penetration of the drill bit and wear rate of the drill bit is stored for a range of values of the or each variable and parameter, and means for scanning the stored data and identifying values of adjustable variables at which one or more controlled parameters are predicted to be substantially optimum, and means controlled by the computer means to adjust said selected adjustable variables to the identified values.

Preferably, in a process in accordance with the invention adjustable variables to be controlled are the rate of rotation of the drill bit and the thrust applied by the drill bit. The first and second controlled parameters are suitably drill penetration rates and bit wear rates while the third controlled parameter which is to be optimised (that is minimised in the present instance) is the cost per unit distance drilled.

In considering the total cost control of a drilling programme, the significant cost components are related either to the total time for which the rig is operational or to the quantity of consumables used. The consumables cost will be principally for bits and therefore bit wear rates are critical. The total drilling time is made up from two operational activities; drilling and tripping. These in turn will be dependent upon the penetration and wear rates.

Penetration and wear rates are also dependent on the type of bit and its condition, the circulation of drilling fluids or mud, the rock type and condition and the current depth of the hole being drilled. Bit type and circulation will be under the control of the driller (although circulation could be chosen as —further adjustable variable to be controlled automatically if desired) and the other factors are dependent on location of the drilling.

In general penetration rate should be as high as possible since this reduces the total time and therefore cost to completion. However increased penetration often causes increased bit wear. High wear rates result in greater bit consumption and more time spent tripping the hole. It is therefore evident when considering the cost of drilling that, in shallow holes with short tripping times, high penetration is best. In deep holes the penetration rate may need to be sacrificed to enhance the bit life so that a different set of optimum conditions apply. The penetration and wear rates also depend on the strata type so that the balance of optimum conditions continuously vary.

Previous attempts to apply control techniques to this problem have relied on empirical equations for wear and penetration and a series of drill off tests for each bit and formation type. The equations have been limited in their application due to their inability to cope with rapidly changing conditions.

A basic optimisation procedure consists simply of choosing a reasonable (or even random) set of starting conditions for the input and measuring the output. One input e.g. thrust is then incremented, if the output condition improves another increment is added, if not then the input is decremented. This process is repeated until the operating point cycles either side of the optimum. In a multi-variate system such as drilling, the process is repeated continuously for each independent variable, e.g. thrust, rate of rotation etc.

Various schemes exist for speeding up the optimisation and, for fine tuning close to the optimum point. Problems can arise with this type of optimisation when complex relationships with multiple slope inversions are involved. Work on complex surfaces has shown that Fourier analysis of the slope data can give an indication of multiple peaks, search algorithms can then be triggered to locate them.

In a preferred embodiment of the invention the control system is based on minimisation of cost per unit depth of hole.

The cost is assessed from a cost equation which is essentially dependent upon the drilling rate and wear rate. In a real drilling situation the penetration rate is relatively easy to measure, however the in-situ measurement of bit wear is a problem. MWD (measurement while drilling) systems for wear indication are available but their high cost has forced their elimination.

In a preferred embodiment of the invention, bit wear rate is computed not from empirical equations but from a self-learning data base within the control system. The estimate of wear rate is based on the measured adjustable variables and the controlled parameters which can be readily established, together with simple classification of drill chips to identify the type of strata being used.

In the preferred drilling process in accordance with the invention, each time the bit is pulled new wear rate data is generated and stored in the data base. This has the enormous advantage that the data base is continuously improved and it can be exchanged rapidly between rigs and sites building up information for wear rate assessment. Such a data base will be of great value to operators, designers and manufacturers.

There now follows a detailed description to be read with reference to the accompanying drawings of a drilling process and drilling apparatus embodying the invention. It will be realised that this process and apparatus have been selected for description to illustrate the invention by way of example.

The illustrative process and apparatus have been designed for use on large oil and gas rigs; however, similar control systems can be utilised in any drilling operation, even in machine shop drilling if desired.

The illustrative apparatus utilises a DC motor with thyrister controlled variable speed drive; however, any suitable variable speed motor which may be hydraulic or pneumatic, may be used in apparatus in accordance with the invention.

The torque delivered by these DC motors can be monitored by measurement of the motor output power and the rotational speed. Torque is then derived from the equation:

$$T = \frac{W_{in} - W_{loss}}{2\pi n}$$

Where:
n = rotational speed
$W_{in}$ = input power
$W_{loss}$ = motor power loss The motor power loss can be determined from the motor characteristics and the armature current and the rotational speed. The measuring system therefore consists of transducers, measuring circuits and software which monitor the rotational speed, the motor current, and the input power. The measurement of power is complicated by the use of thyristor controllers and the non-sinusoidal waveforms which they produce.

The fundamental definition of power in an AC circuit is utilised and implemented in electronic hardware:

$$W = \int_0^t i.v \cdot dt$$

Where:
t = time
W = power consumed
i = current
v = voltage

The product i.v. is obtained from a four quadrant multiplier which uses sampled inputs of the motor current and voltage. This produce is then integrated using a standard integrator circuit. The output is then scaled, digitised and fed to a computer input. Armature current is monitored using a true RMS to DC converter the output of which is also digitised and fed to the computer. RPM is monitored by any suitable means e.g. a tachogenerator or by time interval measurements in conjunction with optical or proximity detectors. The computer means is then used to calculate the losses and determine the torque.

In the illustrative apparatus, thrust on the drill bit is controlled pneumatically; however, hydraulic thrust control or, for very deep holes, braking of the drill tube (to control the load applied by gravity) may be used to control the thrust applied by the drill bit. In the illustrative apparatus both the rate of rotation and thrust on the drill bit are placed under the control of computer means and control is achieved using stepper motors coupled to the speed potentiometer and to the pressure control regulator. In addition, the computer means is programmed to stop drilling if excessive torques are detected or when the drill reaches a desired depth.

Although in the illustrative embodiment flushing rate is not a variable adjustable by the control system, the flushing rate is measured using a suitable equipment, for example a low cost turbine flow transducer.

Transducers are positioned appropriately to measure rate of rotation of the bit, downward thrust applied to the bit, and depth of penetration.

Figure 2:
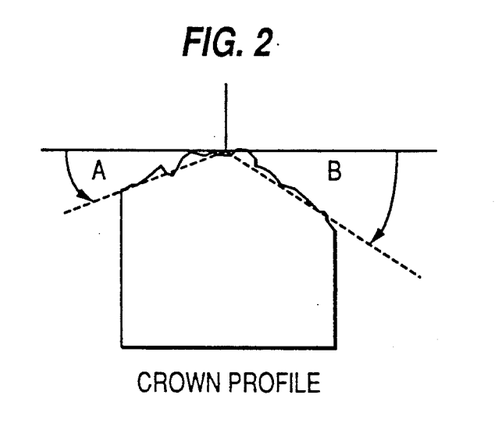
FIG. 2 is a diagram of a diamond bit crown profile, showing two index angles.

In order to operate the illustrative control system information on the wear rate of the bit is required; this is obtained to provide a data base according to the type of bit and the strata drilled, by maintaining a constant rotation rate and thrust between each pull of a drill bit and examining the drill bit after each pull to determine the wear rate. Wear rates can conveniently be determined by using the jig shown in FIG. 2, already known. Calculation of volume loss from the crown gives some indication of wear rate and can be effected by computer means. Index angles A, B are used to describe profile shape of the drill bit and to give an indication of how the crown profile changes with drilling parameters.

The wear measurement analysis has been greatly assisted by the feedback control loops on the drill as the computer can be instructed to keep various parameters constant, e.g. speed, load or penetration rate. This has allowed the machine to be essentially automatic such that once the hole has been started, the drill may be left unattended to finish the coring process, the drill switching off when the hole is finished or a problem arises.

The jig for measurement of crown profile was described in a paper by Cassapi, V. B.; Waller M. D.; and Ambrose D, (1987) entitled "Performance and Wear Characteristics in Diamond Core Drilling" given at Drillex 87.

In optimising penetration using the illustrative apparatus thrust was made the governing adjustable variable as thrust plays a major role in effecting penetration rates.

Figure 3:
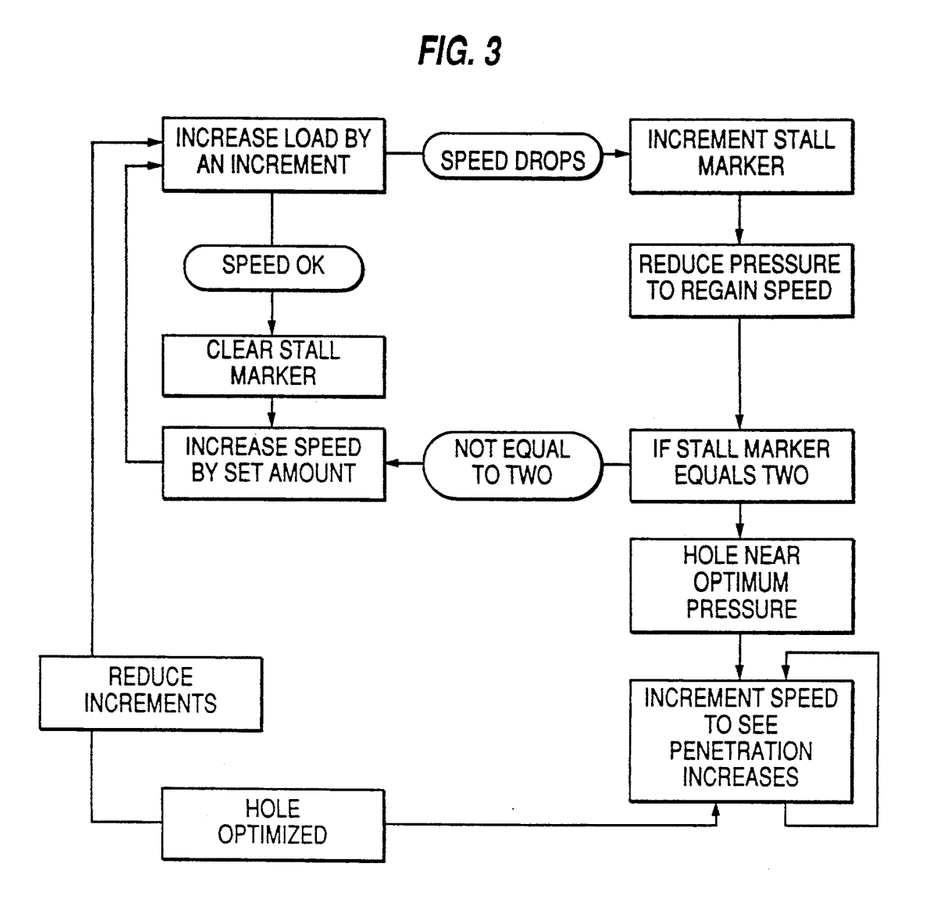
FIG. 3 is a diagram of an algorithm for optimisation of penetration rates.
Figure 4:
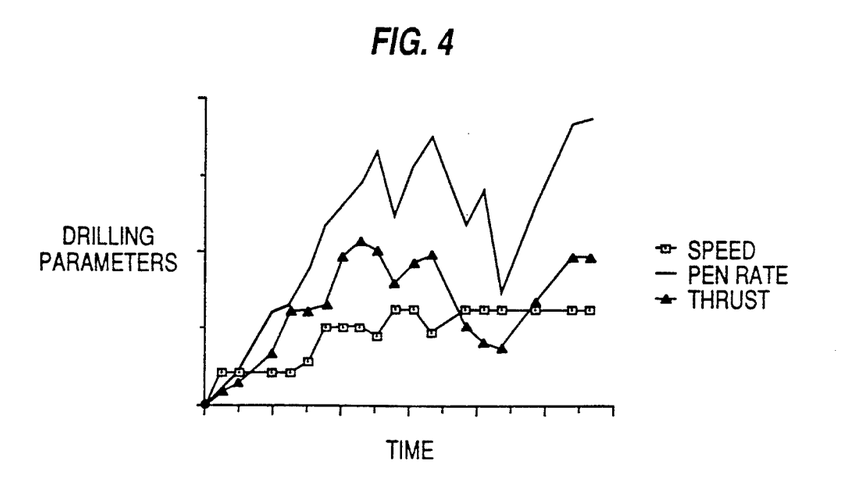
FIG. 4 is a plot of drilling parameters against time, with the drill under optimum penetration control.

The basic algorithm for optimising penetration is shown in FIG. 3.

As seen, the algorithm gradually increases both load and speed, until such time that repetitive increases in load with similar speeds, begins to stall the drill, i.e. the drill has reached its optimum pressure. Once achieved, speed is tested to see if any increase results in improved penetration rate.

In optimising the cost of a drilling operation on the basis of cost per distance drilled, the following equation (Moore P. L.; Drilling Practices; Pannwell Books 1974) is well known.

$$C = \frac{B + R(t + T)}{F} \quad (1)$$

where
C = cost per meter
B = cost of the bit
R = rig cost per time interval
t = rotating time
T = tripping time
F = distance drilled with the bit Cost control is centred around specific relationships for example, load versus speed, wear rate of the bit etc., which all influence equation (1). As a result of the large number of variables and their interactions, the control theory is complicated. Control algorithms can include partial differential equations, but these are generally rendered unsolvable due to the large number of unknowns.

From equation (1), we have an equation that links cost to various parameters of the rig. Provided we can differentiate the equation, the theory of maxima and minima can be used to fine the minimum cost per meter for a given set of constants e.g. depth, rig costs, bit costs etc.

The Cost Equation

Expanding equation (1), gives $$C = \frac{B}{F} + \frac{R \cdot t}{F} + \frac{R \cdot T}{F} \quad (2)$$

Considering diamond drilling, the distance drilled by the bit can be expressed in terms of kerf height and the expected wear rate, such that $$F = \frac{\text{Kerf Height } (K)}{\text{Wear Rate } (W)}$$

Also $$\text{Penetration Rate } (P) = \frac{\text{Distance Drilled } (F)}{\text{Time Taken } (t)}$$

Substituting into equation (2), gives $$C = \frac{B}{(K/W)} + \frac{R}{P} + \frac{R \cdot T}{(K/W)}$$

Of the tripping time is expressed in terms of the time taken per meter, using D for the depth, the tripping cost at any depth can be calculated. Thus $$C = \frac{B \cdot W}{K} + \frac{R \cdot Tm \cdot D \cdot W}{K} + \frac{R}{P}$$

where Tm = tripping time per meter
Therefore $$C = \frac{(B + R \cdot Tm \cdot D) \cdot W}{K} + \frac{R}{P} \quad (3)$$

In this equation, there are two basic variables, penetration rate and wear rate. Using the theory of Maxima and Minima, when the first derivative is equal to zero a maximum, minimum or inflection is found. It is possible to determine which one has been found, and thus a minimum cost can be established by solving the equation with respect to penetration rate and wear rate.

To solve the equation however, due to there being two independent variables either partial differentiation is required or a relationship between wear rates and penetration rates must be found. Since partial differentiation can lead to complicated equations the relationship method was applied first.

As wear rates are hard to determine, especially in the field, penetration rate was selected as the controlling parameter. This also had the bonus of simplifying the differentiation.

Therefore using the relationship wear = a function of penetration rates (w = f(P)) and substituting into equation 3, gives, $$C = \frac{(B + R \cdot Tm \cdot D) \cdot f(P)}{K} + \frac{R}{P}$$

Differentrating, this gives $$\frac{dC}{dP} = \frac{(B + R \cdot Tm \cdot D) \cdot f(P)}{K} - \frac{R}{P^2} \qquad (4)$$

To find the minimum we equate to zero and solve with respect to penetration rate.

i.e.

$$f(P) \cdot P^2 = \frac{R \cdot K}{(B + R \cdot Tm \cdot D)} \qquad (5)$$

To solve the equation however, the relationship W=f(P) must be found. This has been done using data obtained at Nottingham and a polynomial curve fitting programme. This is described in Appendix A.

However, it should be noted that in reality wear rates are not solely a function of penetration rates but have many other influencing parameters such as speed, rock composition etc. Therefore this technique does not provide a totally satisfactory solution to the cost equation.

Despite this limitation, it does serve its purpose as a model which has an easy and computable solution. It is hoped that certain trends may be established to show which of the "constants" in equation 1 play a major part in influencing the final hole cost e.g. it is well known that differing rock types give differing wear rates, thus giving different emphasis on the control parameters.

Current work on the correlation between penetration rates and wear rates will indicate the error in the assumption and its influence on the cost equation. If this error is minimal, this method becomes an easy and simple way of solving the cost equation for minimum cost drilling.

Partial differentiation of equation (1) was also tried, resulting in the two partial differential equations below.

$$\frac{dC}{dP} = \frac{(B + R \cdot Tm \cdot D)}{K} \cdot \frac{dW}{dP} - \frac{R}{P^2}$$

$$\frac{dC}{dW} = \frac{(B + R \cdot Tm \cdot D)}{K} - \frac{R}{P^2} \cdot \frac{dP}{dW}$$

However, these equations still require a link between penetration rate and wear rate. This results in a number of unknown partial derivatives, making solution complex if not impossible. For this reason, this avenue for a solution to minimum cost drilling was not pursued, to date.

As can be seen from the above, both solutions have their limitations and therefore a different method is required. A preferred scheme is to adapt a simple numerical iterative technique to search the cost equation for areas of minimum cost.

Unfortunately, wear and penetration rates are interdependent such that for a given wear rate, the range of penetration rates available is restricted, therefore we have to interrelate the two. A method for this had previously been investigated in which equations were used to predict the wear and penetration rates of tricone bits in a single lithology.

The third method uses iterative techniques to search out combinations of parameters yielding minimum cost. The method described does not currently include fixed costs and some variable costs e.g. site charges, mud cost etc. but the structure of both hardware and software allow inclusion of these in due course.

However, according to the invention a self-learning system which uses simple artificial intelligence and data interpolation has been developed to:
1) provide estimation and control of penetration rates
2) assuming those penetration rates, infer an associated wear rate.

Figure 5:
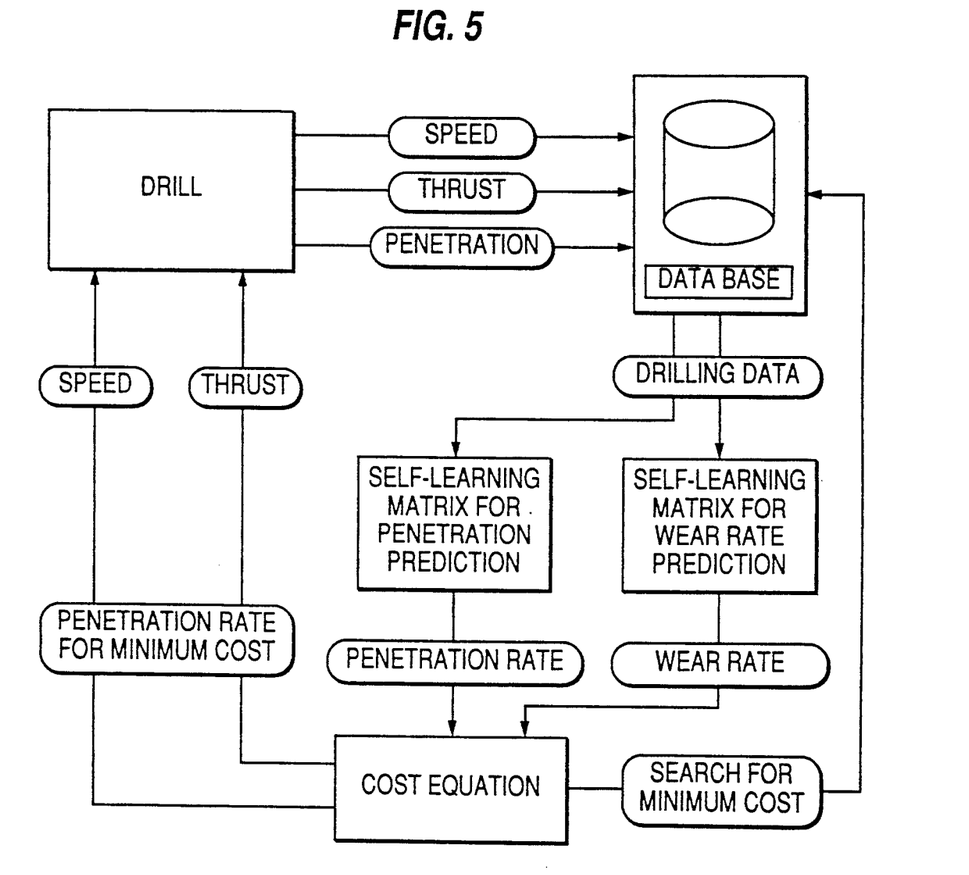
FIG. 5 is a schematic diagram of of the process control system.

The system comprises two parts, both using a self-learning matrix arrangement and is shown in FIG. 5.

Taking penetration rate control for example, for given rock types, penetration rates are entered in to the data base, along with the corresponding adjustable variables. At present only loads and speed are entered by the system has been designed for easy expansion to include such things as flush rate, bit type etc.

The known data points are then used to interpolate unknown penetration rates, for various loads and speeds. If subsequent known points are entered, the matrix is recalculated.

The self-learning matrix itself has been tested for its accuracy using artificial data. The results are encouraging. if the matrix has 30% of known data points, 90% of the date is within 10% accuracy. The accuracy of the matrix will obviously increase as more real data is fed in. In the case of wear, data such as penetration rate, speed, load and specific energy are entered and used in an identical way.

A prototype system has been developed using the computer search method. It has been tested on simulated holes of known geology and drill and wear data collected. It is planned that the data base and self-learning matrices can be extended and continually up dated to cope with any bit type or rock formation.

In order to interpolate unknown penetration rates at various loads and speeds a ripple technique is used in which information about the various drilling parameters provided by the electronics is loaded onto a data base, while the drill is operating. The information stored is then used to load a series of LEDT's (Limited Entry Decision Tables) which use various adjustable variables such as speed, load, flush, bit type, etc to store values of the associated penetration rate or wear parameter.

Since the LEDT's may be only partially full, a method for estimating the unknown points has been developed. This process is analogous with that of ripples in a pool, such that a point entered into the table has its value interpolated with the surrounding points in a ripple like fashion until such time as the effect is no longer felt. The interpolation is then terminated.

The values of the to LEDT's are put through the cost equation shown below, to generate another LEDT, of cost values. This cost LEDT, is then searched for areas of minimum cost and the appropriate parameters selected. With progressive drilling, new values for wear and penetration are entered into the LEDT's, and the cost matrix is consequently updated and re-searched.

$$C = \frac{(B + R \cdot Tm \cdot D) \cdot W}{K} + \frac{R}{P} \qquad (3)$$

The search routine uses a vector calculation of the surrounding points to determine the best possible direction to search for minimum cost.

Figure 6:
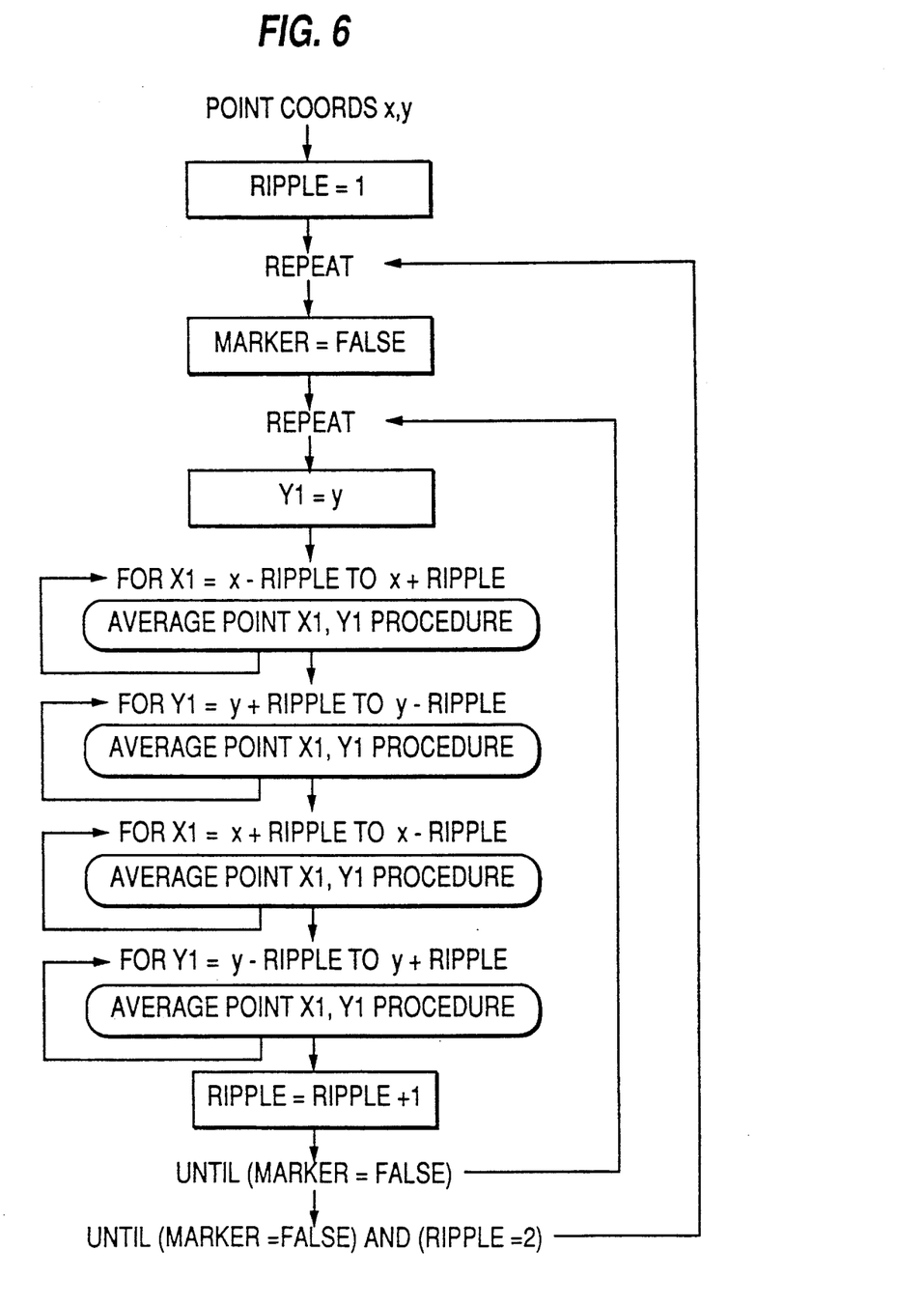
FIG. 6 is a flow diagram showing a ripple interpolation technique utilised in assembling data for the control system.

FIG. 6 is a flow chart showing the various stages in carrying out this ripple technique indicate the computer language operated is Pascal.

Figure 7:
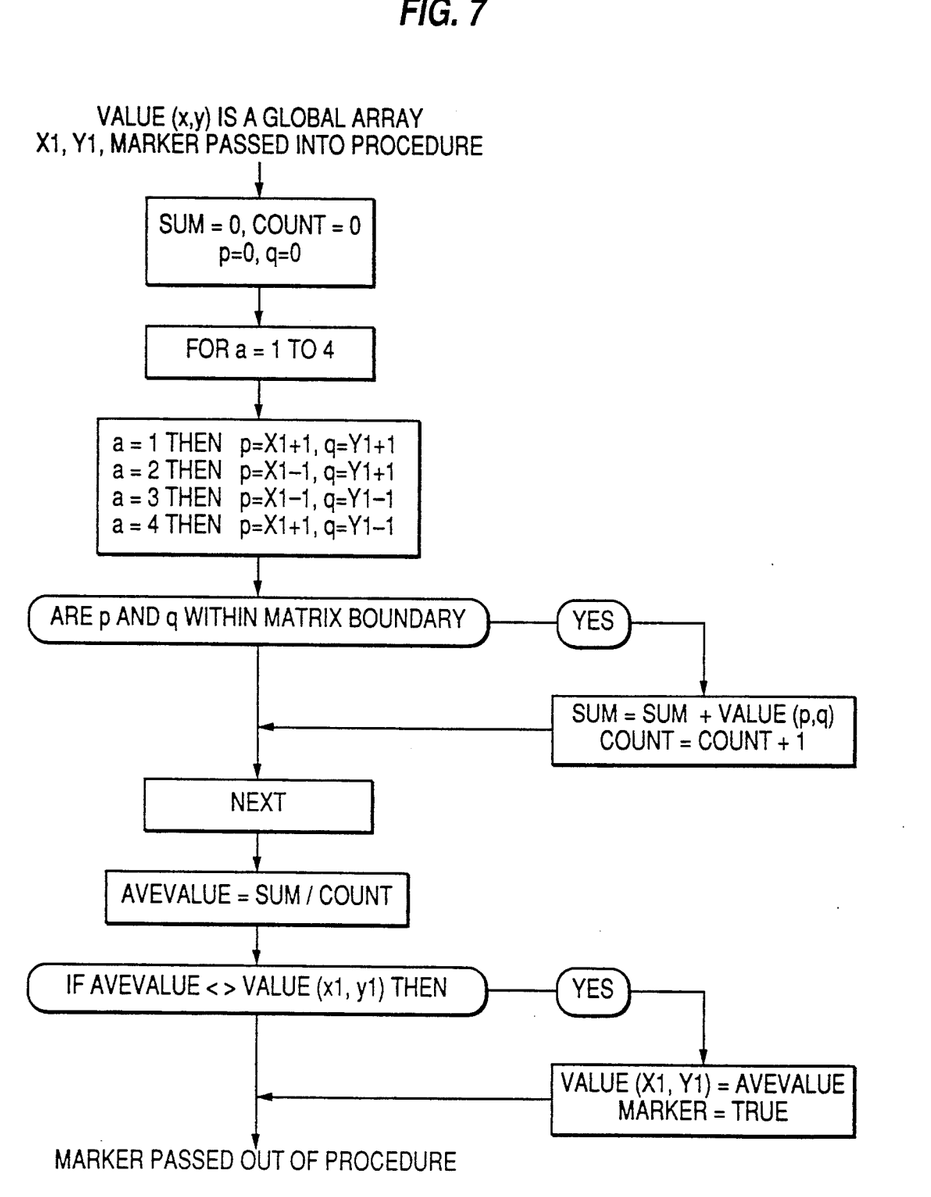
FIG. 7 is a flow diagram for an averaging procedure used in the ripple interpretation technique.

The average point procedure utilised in the riple technique is shown in FIG. 7. This procedure produces an average for that particular point. At present only the four adjacent values are considered, in a cross format, but other schemes such as curve fitting across a wide sample of data to attain a value for that point are possible In order to further improve the usefulness of the control system according to the invention specific energy may also be included.

Specific energy is the energy used to excavate or break a unit volume of rock. It also serves to give an indication of the efficiency of the process. It is easily calculated for rotatory drilling as shown by Teale (Teale, R: (1965): The concept of specific energy in rock drilling: Int. J. Rock Mech and Min. Sci. Vol. 2, p57-73),using the equation below.

$$e = \frac{F}{A} + \frac{2\pi}{A} \cdot \frac{N \cdot T}{P}$$

where
- e = Specific Energy
- F = Thrust
- A = Area of the bit
- N = R.P.M.
- T = Torque
- P = Penetration Rate As stated above, the optimisation system currently uses simulated holes and hence known geology, to provide feedback drill control. In the field however, the majority of holes drilled are into areas of unknown geology or regions with limited knowledge.

Research has shown, that specific energy, along with accurate drill depth measurements, can be used to indicate strata boundaries and voids etc. It is envisaged that this will be incorporated into the system when applied in the field. The prediction of the actual rock type being drilled is still in its early states and it is unlikely that specific energy alone will ever be able to indicate the exact rock type.

However research has produced some very encouraging results. A number of rock samples consisting of limestones and sandstones were cored and the drill parameters monitored. From the data the specific energy from each core was calculated, along with UCS (Ultimate Compressive Strength) obtained from the cores: there is a distinct zoning of the two types of rock.

The current programme of research is extending to other types of rocks, for example igneous and silts etc to see if they too fit into distinct zones. From these results along with other information such as a rough drill cutting analysis it may be possible to predict the rock type being drilled.

The prediction of wear rates especially those for diamond bits is complex and often requires large volumes of experimental data.

As stated earlier, the drill rig and associated software, has been extended to allow easy volume loss calculation. In conjunction with specific energy test versus rock type described above, several new dimensions may be added to see if any correlation with wear rates can be found.

1) Specific Energy Vs Wear Rates
2) Fractal Dimensions Vs Wear Rates
3) Silica content Vs Wear Rates The fractal index is used to describe the shape/ angularity of a particle, such that the higher the index the greater the angularity/roughness. At present it is not known how great a bearing particle shape will have on wear rates, or if they are the major contributing factor rather than particle composition.

APPENDIX A

To enable a solution to the differential equation, a relationship between wear and penetration rates must be found i.e. $w = f(P)$. As wear data for diamond bits was available it was decided to use this and perform a curve fitting exercise to obtain an equation for the produced line.

This involves the method of Least squares, producing a polynomial equation. For simplicity, the polynomial equations were kept to forth order and below. A general fourth order equation is shown below.

$$W = E.P^4 + D.P^3 + C.P^2 + B.P + A$$

where A, B, C, D and E are calculated constants.

For each set of wear data visual selection of the best order fit is required, and subsequently stored within the data base. The fit being recalculated if additional data is added to the data base.

During the running of the cost control programme, the appropriate wear equation is selected, giving a function of wear in terms of penetration rate. This is substituted into equation (4) and differentiated.

The resulting differential equation is solved using Newton Rapson method of iteration.

$$x_{n+1} = x_n + \frac{f(x)}{f'(x)}$$

The calculated value for penetration rates, is substituted back into equation (3), yielding the minimum cost per meter.

We claim:

1. A drilling process comprising urging a rotating drill bit towards a mass to be drilled, and controlling the thrust applied and the speed of rotation, the process comprising monitoring at least one parameter selected from controlled parameters including rate of penetrating of the drill bit and wear rate of the drill bit, and adjusting at least one related variable selected from adjustable variables including rate of rotation of the drill bit and thrust applied to the drill bit so as to bring the controlled parameters to operating values at which the cost of drilling per unit depth is substantially minimized.

2. A process according to claim 1 wherein a relationship between bit penetration rate and bit wear rate is determined and penetration rate substantially optimized whereby to substantially optimize the cost of drilling per unit depth.

3. Apparatus suitable for use in carrying out a process according to claim 1 comprising means for rotatably mounting a drill bit, drive means for rotating a drill bit mounted in the mounting means, means for controlling the speed of rotation of the drill bit, means for controlling the thrust applied to the drill bit, means for determining the rate of penetration of a drill bit in a drilling operation, and computer means adapted to store data, and to calculate values of adjustable variables predicted to be necessary to achieve drilling at a substantially minimum cost per unit depth.

4. A drilling process comprising establishing a first matrix storing known data relating variables selected from adjustable variables including rotation rate of a drill bit and thrust applied to a drill bit, to a first parameter selected from controlled parameters including bit penetration rate and bit wear rate, and using the known data points to interpolate predicted values for the first controlled parameter for other values of the adjustable variables, establishing a second matrix storing known data relating the first parameter and a second control parameter to a third parameter, and using the known data points to interpolate predicted values for the third parameter for other values of the first and second controlled parameters, searching the second matrix for an optimum value of the third parameter and thereby determining optimum values for the first and second parameters and adjusting the adjustable variables to the value indicated by the first matrix to be necessary to achieve the determined optimum value for the first control parameter.

5. A process according to claim 4 comprising monitoring the actual value for the first control parameter achieved with the adjustable variables at said indicated values and entering this data and recalculating the first matrix accordingly to provide a current first matrix, and re-adjusting the adjustable variables to the value indicated by the current first matrix to be necessary to achieve the determined value of the first parameter.

6. A process according to claim 4 comprising monitoring actual values for the first and second parameters entering this data, recalculating the second matrix accordingly, and utilising data from the recalculated second matrix to calculate revised predicted values for the first and second parameters to optimise said third parameter, and readjusting the adjustable variables to the value indicated by the current first matrix to be necessary to achieve the predicted value of the first parameter.

7. A process according to claim 4 wherein the adjustable variables are rotation rate and thrust applied.

8. A process according to claim 4 wherein the third parameter is cost per unit depth of hole.

9. A process according to claim 4 wherein the first controlled parameter is bit penetration rate.

10. A process according to claim 4 wherein the second controlled parameter is bit wear rate.

11. A process according to claim 4 wherein the equation by which values of the third parameter are calculated from the first and second parameters are calculated is $$C = \frac{(B + R \cdot Tm \cdot D) \cdot W}{K} + \frac{R}{P}$$

where
C = cost per unit distance drilled
B = cost of the bit
R = rig cost per unit time
Tm = tripping time per unit distance drilled
D = depth of hole
W = wear rate
K = kerf height
P = penetration rate.

12. A process according to claim 4 comprising monitoring at least one further controlled parameter and establishing a further matrix or matrices by which values for the second controlled parameter can be predicted.

13. A process according to claim 12 wherein the further control parameter is specific energy, namely the energy required to excavate or break a value of rock.

14. A process according to claim 13 wherein the specific energy is calculated from the following relation $$e = \frac{F}{A} + \frac{2\pi}{A} \cdot \frac{N \cdot T}{P}$$

where
e = specific energy
F = thrust
A = area of bit
N = revolutions of bit per minute
T = torque
P = penetration rate.

* * * * *